United States Patent Office 2,924,602
Patented Feb. 9, 1960

2,924,602

SEPARATION AND RECOVERY OF PICOLINES AND LUTIDINES FROM NITROGEN BASE MIXTURES

Werner C. von Dohlen, Charleston, and William F. Tully, South Charleston, W. Va., assignors to Union Carbide Corporation, a corporation of New York No Drawing. Application November 17, 1958
Serial No. 774,076

12 Claims. (Cl. 260—290)

Tar base fractions commonly described as "commercial picoline" or "beta-gamma-picoline fractions" consist of mixtures of beta-picoline, gamma-picoline and 2,6-lutidine. The percentages of each vary from mixture to mixture and the proportions of the three are usually roughly equal. Such mixtures may also contain ethylpyridine, dimethylpyridine, methylethylpyridine, and the like.

Numerous separation methods have been suggested and tried for separating such mixtures. Many involve the crystallization of one or more of the components as adducts or complexes with an added agent. United States Patent No. 2,728,771 describes the separation of gamma-picoline by precipitation as the oxalate salt. The process requires the use of caustic to liberate the base from the oxalate salt to permit its recovery. Other processes suggest complicated precipitation schemes involving several precipitating agents and often a number of reprecipitations from various solvents. The urea and thiourea complexes of 2,6-lutidine have also been used to separate that component from the picolines according to United States Patents Nos. 2,325,880 and 2,295,606.

A number of chemical methods wherein differences in chemical reactivity of the components with sulfur and phthalic anhydride are employed to eliminate all but one component have been reported, as in United States Patents Nos. 2,272,159 and 2,443,479. For mixtures containing sizeable amounts of all three components the latter methods can be considered economically feasible only if the reaction products have market value. Many distillation processes have also been suggested. Most of these however require highly efficient distillation equipment and must be operated with a relatively slow removal of product, thereby reducing their desirability. Azeotropic distillations with sulfur dioxide, water, phenols and carboxylic acids appear among these processes, as in United States Patents Nos. 2,412,649, 2,412,650 and 2,412,651.

We have now discovered that the desired separations of beta-picoline, gamma-picoline and 2,6-lutidine from various mixtures can be readily accomplished by the use of certain borate esters. According to the process of our invention the mixture to be separated is preferably first dissolved in a hydrocarbon solvent and to the solution there is then added a borate ester of the type $B(OR)_3$ where R is phenyl or lower alkyl substituted phenyl. These borate esters will preferentially precipitate from the solution a gamma-picoline rich precipitate. After removal of this precipitate the addition of more borate ester to the mother liquor will precipitate a beta-picoline rich precipitate and leave most of the 2,6-lutidine in solution.

The particular borate ester employed will result in some variance in the proportions of gamma-picoline and beta-picoline in the gamma-picoline rich precipitate and in the beta-picoline rich precipitate. The picolines will be almost completely removed from the solution, however, before any 2,6-lutidine precipitate will form. The recovery of the bases from either a precipitate or a mother liquor is readily accomplished. The solvent is distilled from the mother liquor and recycled and then the base fraction, boiling at about 144° C. is distilled and collected. Some borate ester residue and small amounts of the particular phenol may remain but these can be distilled and recycled.

The crystalline precipitate fractions, after being washed with fresh solvent, can also be resolved into base and borate ester portions by distillation at atmospheric or reduced pressure. The vapor pressures of the borate esters are so low at the boiling temperatures of the bases, about 144° C., that the bases distill free of any borate ester which remains as kettle residue. Borate ester residue can be purified by vacuum distillation, although in favorable cases it may be recycled directly to the precipitation step after the bases have been distilled.

Binary mixtures of beta-picoline and gamma-picoline or of either of these with 2,6-lutidine can be resolved by similar methods. When 2,6-lutidine is to be separated from beta-picoline or gamma-picoline, the mixture is preferably dissolved in a solvent and the picoline component is precipitated as a borate ester complex by the addition of an approximately stoichiometric equivalent of borate ester, while the lutidine remains in the mother liquor. In the case of mixtures of beta-picoline and gamma-picoline, it is the gamma-picoline which precipitates first as the borate ester is added, and the beta-picoline which remains in the mother liquor. In either case recovery of the separated bases from the precipitate and from the mother liquor is accomplished in the manner described above.

The process of the invention can also be employed to separate either gamma-picoline or beta-picoline or both from mixtures with alpha-picoline, mixed lutidines, and higher alkyl pyridines such as result from the commercial production of methylethylpyridine. The procedure is to add borate ester in an amount stoichiometrically equal to the quantity of beta-picoline present. Recovery of the picoline from the precipitated borate ester complex thereof is achieved by distillation. If the product is a mixture of beta-picoline and gamma-picoline it can be resolved into individual components in the manner previously described.

The borate esters suitable for use in the process of the invention are of the formula

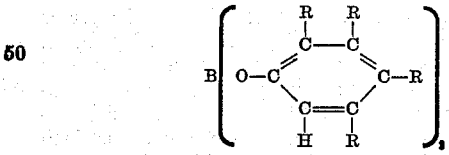

wherein R is hydrogen or a lower alkyl group containing up to six carbon atoms. Preferred borate esters are those derived from such phenols as phenol, ortho-cresol, meta-cresol, 2-methylphenol, 3-methylphenol, 4-methylphenol and 2-isopropylphenol, and include tri(ortho-cresyl) borate, triphenyl borate, tri(ortho-isopropylphenyl) borate, tri(meta-cresyl) borate and the like. In general, phenols with two ortho substituents are unsatisfactory and borate esters such as tri(2,6-diisopropylphenyl) borate do not complex appreciably with the picolines and lutidines because of steric hindrance resulting from the blocking of the boron atom by the alkyl chains when in both ortho positions. The naphthyl borate esters cannot be used because of similar steric hindrance.

Other suitable borate esters for use in the process of the invention include those derived from such phenols as para-cresol, 2,4-dimethylphenol, 2,3-dimethylphenol, 3,4-dimethylphenol, 2-methyl-4-ethylphenol, 2-methyl-4-normal-propylphenol, 2-methyl - 4 - isopropylphenol, 2-methyl - 4 - normal-butylphenol and 2-methyl-4-tertiary-butylphenol.

The borate esters used in the process of the invention do not react violently and their complexes with the bases are not highly corrosive. They have the further advantage of being stable at fairly high temperatures, those in excess of 300° C. Preferably the borate is added to the base mixture as a solution of the borate in a hydrocarbon solvent of the class described below. The quantity of borate ester employed is not narrowly critical but will ordinarily be approximately stoichiometrically equal to the quantity of the particular base which it is desired to precipitate. When a stoichiometric excess of borate ester is employed precipitation of the complex will be somewhat more complete and the recovery somewhat higher, but the purity may be adversely affected because of the precipitation of components which should remain in the mother liquor. Conversely, when a stoichiometric deficiency of the borate ester is employed the yield of the precipitated component will be somewhat lower but the purity will be enhanced, while the purity of the mother liquor may be adversely affected.

The solvent employed in the process of the invention may be either an aromatic or aliphatic hydrocarbon. In order to facilitate separation of the solvent and the product, it is preferred to choose solvents with boiling temperatures substantially above or below the boiling temperature of the product. Solvents which boil at temperatures below the boiling temperature of the base products may be distilled from the products. Such solvents include benzene, pentane, cyclohexane, methylcyclohexane and the like. Solvents such as decalin and tetralin which boil at temperatures above the boiling temperatures of the base product permit immediate distillation of the product. The relative quantity of solvent employed is not critical and the volume ratio of solvent to base mixture may vary from about 1:5 to 10:1 or more. Between about 2 and 5 volumes of solvent per volume of base mixture is ordinarily preferred.

Example I

As a by-product from the production of methylethylpyridine there was obtained a mixture consisting, on a weight basis, of 4.5 percent methylethylpyridine, 56.2 percent gamma-picoline, 15.6 percent alpha-picoline, and 23.7 percent mixed lutidines and ethylpyridines. A 235 gram sample of this mixture was dissolved in 250 milliliters of pentane. To the thus-formed solution was added, slowly and with stirring, a solution of 433 grams of tri(ortho-cresyl)borate in 500 milliliters of pentane. Precipitation occurred immediately and a slurry was formed. The slurry was centrifuged and the solid material thus obtained was washed with pentane and transferred to the kettle of a twelve inch long, one inch inside diameter still column packed with stainless steel saddles.

The still was then operated at a temperature of about 144° C. and a reflux ratio of 6:1. Under these conditions there were obtained as distillate 99 grams of gamma-picoline. This picoline had a freezing point of 2.5° C. and was found by mass spectrometry to be 99 percent pure gamma-picoline. This represented recovery as high purity gamma-picoline of 75 percent of the gamma-picoline originally present in the mixture.

A total of 377 grams of tri(ortho-cresyl)borate was recovered from the kettle and found to be ready for reuse in the process. The filtrate from the centrifuging step and the pentane washings were charged to a still and the pentane was distilled and set aside for reuse in the process. Further distillation removed the nitrogen bases and left 30 additional grams of tri(ortho-cresyl)-borate ready for reuse in the process.

Example II

Fifty grams of 2,6-lutidine and 150 grams of gamma-picoline were dissolved in enough pentane to make one liter of solution. To this solution was added, slowly and with stirring, a solution of 525 grams of tri(ortho-cresyl)borate dissolved in one liter of pentane. A large quantity of white precipitate formed. This precipitate was recovered by filtration and washed with pentane to remove adhering mother liquor. The precipitate was then transferred to the kettle of a twelve inch long, one inch inside diameter still column packed with stainless steel saddles.

The still was operated at temperatures between 120° C. and 145° C. and a reflux ratio of 6:1. Under these conditions there was obtained as distillate 143.8 grams of a base fraction which, by infrared analysis, was found to be composed of 96.5 weight percent gamma-picoline and 3.5 percent 2,6-lutidine. Thus, 92.5 weight percent of the gamma-picoline contained in the original mixture was recovered in better than 96 percent purity. The mother liquor from the filtration step was heated in the above-described column and the pentane was first distilled. A base fraction was then distilled at a temperature between 122° C. and 155° C. and 45 grams were thus collected and found by analysis to contain 90 weight percent 2,6-lutidine and 7 percent gamma-picoline. This fraction accounted for about 84 weight percent of the 2,6-lutidine in the original mixture.

Example III

Fifty grams of gamma-picoline and 53 grams of 2,6-lutidine were dissolved in 500 milliliters of pentane. To this solution was added, slowly and with stirring, a solution of 159 grams of triphenyl borate dissolved in a mixture of 500 milliliters of pentane and 500 milliliters of benzene. A precipitate formed immediately and was recovered by filtration and washed with pentane to remove adhering mother liquor. The precipitate was then transferred to the kettle of a twelve inch long one inch inside diameter still column packed with stainless steel saddles.

The still was then operated at temperatures between 140° C. and 163° C. and a reflux ratio of 6:1. Under these conditions there was obtained as distillate 41 grams of a base fraction which was found by infrared analysis to consist of 76 weight percent gamma-picoline and 24 percent 2,6-lutidine. The mother liquor from the filtration was heated in the above-described column and the pentane and benzene were first distilled. A base fraction was then distilled at a temperature between 135° C. and 150° C. and 38 grams were thus collected and were found by analysis to contain 90 weight percent 2,6-lutidine and 7 percent gamma-picoline. The kettle residues from the two distillations weighed a total of 152 grams and consisted of substantially all triphenyl borate.

Example IV

A total of 19.2 grams of gamma-picoline and 21.3 grams of 2,6-lutidine were dissolved in 200 milliliters of hexane. To this solution was added, slowly and with stirring, a solution of 86.2 grams of tri(ortho-isopropylphenyl)borate dissolved in 200 milliliters of hexane. This resulted in the formation of two liquid phases and the lower phase crystallized. The crystals were recovered by filtration and washed with hexane to remove adhering liquid. The crystals were then transferred to the kettle of a twelve inch long, one inch inside diameter still column packed with stainless steel saddles.

Distillation continued at a reflux ratio of 6:1 and a base fraction boiling at temperatures between 140° C. and 150° C. was collected. A total of about 17 grams of this base fraction was collected and it was found by infrared spectrographic analysis to consist of 90 weight percent gamma-picoline and 10 percent 2,6-lutidine.

The mother liquor from which the crystallized lower phase had been recovered was then heated in the column and the hexane was first distilled. A base fraction of about 23 gram was then distilled at a temperature between 140° C. and 145° C. which was found by infrared analysis to consist of 90 weight percent 2,6-lutidine and 10 percent gamma-picoline.

Example V

A total of 170 grams of beta-picoline containing about two percent by weight of gamma-picoline and 30 grams of 2,6-lutidine were dissolved in 500 milliliters of pentane. To this solution was added, slowly and with stirring, a solution of 500 grams of tri(ortho-cresyl)borate dissolved in 500 milliliters of pentane. During the addition of the borate solution the picoline solution was seeded with a crystal of the beta-picoline-ortho-cresyl borate complex and a precipitate formed. The precipitate was recovered by filtration and washed with pentane to remove adhering mother liquor. The precipitate was then transferred to the kettle of a twelve inch long, one inch inside diameter still column packed with stainless steel saddles.

Distillation proceeded at a reflux ratio of 6:1 and a base fraction boiling at temperatures between 140° C. and 150° C. was collected. There were thus obtained 148 grams of base fraction which was found by infrared analysis to consist of 93 weight percent beta-picoline, five percent 2,6-lutidine and 2 percent gamma-picoline. The mother liquor from which the precipitate had been filtered was then heated in the column and the pentane was first distilled. Further distillation at a temperature between 140° C. and 145° C. yielded 48 grams of a base fraction which was found by infrared analysis to consist 44 fo weight percent 2,6-lutidine, 38 weight percent beta-picoline and 2 percent gamma-picoline. The percentage of lutidine would have been higher had a larger proportion of borate ester been used in the precipitation step. Total recovery of borate ester suitable for recycle was 470 grams.

Example VI

A mixture of 31 grams each of beta-picoline and of gamma-picoline was dissolved in 300 milliliters of pentane. To this solution was added, slowly and with stirring, a solution of 139 grams of tri(ortho-isopropyl-phenyl)borate in 300 milliliters of pentane. No precipitate formed, but when an additional 100 milliliters of pentane were added precipitation commenced. Stirring of the solution then continued for about one and one-half hours, at the end of which time precipitation appeared to be complete. The precipitate was recovered by filtration and washed with pentane to remove adhering mother liquor. The precipitate was then transferred to the kettle of a twelve inch long, one inch inside diameter still column packed with stainless steel saddles.

The still was then operated at temperatures between 140° C. and 145° C. and a reflux ratio of 6:1. Under these conditions there was obtained as distillate 16.3 grams of a base fraction which was found by infrared analysis to consist of 82 weight percent gamma-picoline and 18 percent beta-picoline. The mother liquor from the filtration was heated in the above-described column and the pentane was first distilled. A base fraction was then distilled at a temperature between 140° C. and 145° C. in the amount of 41 grams and was found by infrared analysis to consist of 61 weight percent beta-picoline and 38 percent gamma-picoline.

Example VII

A total of 50 grams of beta-picoline and 50 grams of gamma-picoline was dissolved in 500 milliliters of benzene. Inasmuch as triphenyl borate is not very soluble in pentane 135 grams of the borate were placed in one liter of pentane and benzene was added until solution was accomplished. The borate was added to the picoline solution slowly and with stirring. The resulting solution was cooled to about 0° C. and a precipitate formed. The precipitate was recovered by filtration and washed with pentane to remove adhering mother liquor. The precipitate was then transferred to the kettle of a twelve inch long, one inch inside diameter still column packed with stainless steel saddles.

The still was then operated at temperatures between 140° C. and 145° C. and a reflux ratio of 6:1. Under these conditions there was obtained as distillate 19 grams of a base fraction which was found by infrared analysis to consist of 72 weight percent gamma-picoline and 18 percent beta-picoline. The mother liquor from the filtration was then heated in the above-described column and the pentane and benzene was first distilled. Further distillation at a temperature between 140° C. and 145° C. yielded 72 grams of a base fraction which was found by infrared spectrometric analysis to contain 55 weight percent beta-picoline and 36 percent gamma-picoline. The total recovery of triphenyl borate amounted to 128 grams.

Example VIII

A mixture of 69 grams each of beta-picoline and of gamma-picoline was dissolved in 500 milliliters of pentane. To this solution was added, slowly and with stirring, a solution of 246 grams of tri(meta-cresyl)borate dissolved in 500 milliliters of pentane. A precipitate began to form and precipitation was hastened by the addition of more pentane. The precipitate was recovered by filtration and washed with pentane to remove adhering mother liquor. The precipitate was then transferred to the kettle of a twelve inch long, one inch inside diameter still column packed with stainless steel saddles.

The still was then operated at temperatures between 138° C. and 148° C. and a reflux ratio of 6:1. Under these conditions there was obtained as distillate 72 grams of a base fraction which was found by infrared analysis to consist of 67.0 weight percent gamma-picoline and 28.1 percent beta-picoline. The mother liquor from the filtration was then heated in the above-described column and the pentane was first distilled. Further distillation at temperatures between 140° C. and 150° C. yielded 58 grams of a base fraction which was found by infrared spectrometric analysis to contain 68.4 weight percent beta-picoline and 21.3 percent gamma-picoline. The total recovery of tri(meta-cresyl)borate from the precipitate and mother liquor residues was 233 grams.

Example IX

A total of 106 grams of beta-picoline and 103 grams of gamma-picoline was dissolved in 750 milliliters of pentane. To this solution was added, slowly and with stirring, a solution of 360 grams of tri(ortho-cresyl)borate dissolved in 750 milliliters of pentane, and a seed crystal of gamma-picoline-ortho-cresyl borate complex was introduced. A precipitate formed and sufficient heat was evolved to cause the solvent to boil. The solution was allowed to cool and the precipitate was recovered by filtration and washed with pentane to remove adhering mother liquor. The precipitate was then transferred to the kettle of a twelve-inch long, one inch inside diameter still column packed with stainless steel saddles.

The still was then operated at a temperature of about 144° C. and a reflux ratio of 6:1. Under these conditions there was obtained as distillate 99 grams of a base fraction which was found by infrared analysis to contain 84 weight percent gamma-picoline and 14 weight percent beta-picoline. The mother liquor was mixed with an additional 36 grams of tri(ortho-cresyl)borate and further precipitation occurred. The mother liquor was then decanted from the newly formed precipitate and heated in the above-described column. The pentane was first distilled. Further distillation at temperatures between 140° C. and 150° C. yielded 80 grams of a base fraction which was found by infrared spectrometric analysis to contain 83 weight percent beta-picoline and 12 percent gamma-picoline.

Example X

A mixture typical of the picolines fraction recovered from coal tar was made up, consisting of 100 grams each of beta-picoline, gamma-picoline and 2,6-lutidine. This mixture was dissolved in 500 milliliters of pentane. To the thus-formed solution was added, slowly and with stirring, a solution of 357 grams of tri(ortho-cresyl)borate dissolved in 500 milliliters of pentane. A precipitate formed and was recovered by filtration. The precipitate was then dissolved in 500 milliliters of benzene, from which it was reprecipitated by the addition of 500 milliliters of pentane. This new precipitate was recovered by filtration and then transferred to the kettle of a twelve inch long, one inch inside diameter still column packed with stainless steel saddles.

The still was then operated at temperatures of 138° C. to 150° C. and a reflux ratio of 6:1. Under these conditions there was obtained as distillate 72.9 grams of a base fraction which was found by infrared analysis to consist of 90 weight percent gamma-picoline, 7 percent beta-picoline and 3 percent 2,6-lutidine. The benzene containing mother liquor from the second precipitation was then heated in the above-described column and benzene and pentane were first distilled. Further distillation at temperatures of 138° C. to 150° C. yielded 33.8 grams of a base fraction which was found by infrared spectrometric analysis to contain 22 weight percent gamma-picoline, 36 weight percent beta-picoline and 35 percent 2,6-lutidine.

To the pentane mother liquor from the first filtration was added a solution of 357 grams of tri(ortho-cresyl) borate dissolved in 500 milliliters of pentane. This was done to precipitate the remaining beta-picolines and gamma-picolines. The precipitate which formed was recovered by filtration and transferred to the kettle of the above-described still column. The still was then operated at temperatures of 140° C. to 145° C. and a reflux ratio of 6:1. Under these conditions there were obtained as distillate 95.7 grams of a base fraction which was found by infrared analysis to contain 68.2 weight percent beta-picoline, 16.5 weight percent gamma-picoline and 11.0 percent 2,6-lutidine. The mother liquor from this last precipitation was then heated in the above-described column and pentane was first distilled and set aside for reuse in the process. Further distillation at temperatures of 135° C. to 155° C. yielded 66 grams of a base fraction which was found to contain 94 weight percent 2,6-lutidine, with no detectable beta-picoline or gamma-picoline present.

Of the total of 7.14 grams of tri(ortho-cresyl)borate employed, a total of 560 grams was recovered. In addition, 80 grams of ortho-cresol were recovered. The overall recovery of bases was 89 percent.

What is claimed is:

1. Process for resolving a mixture containing beta-picoline, gamma-picoline and 2,6-lutidine which comprises diluting said mixture with a hydrocarbon solvent, adding to the dilute mixture a borate ester having the formula

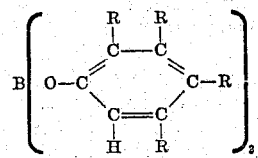

wherein R is selected from the group consisting of hydrogen and lower alkyl groups containing between one and six carbon atoms, separating the thus formed precipitate and distilling said precipitate to recover said gamma-picoline, adding more of said borate ester to the mother liquor from which the precipitate has been removed and thus forming a second precipitate, distilling said second precipitate to yield beta-picoline and distilling said mother liquor remaining to recover said 2,6-lutidine.

2. Process according to claim 1 wherein the borate ester is triphenyl borate.
3. Process according to claim 1 wherein the borate ester is tri(ortho-cresyl)borate.
4. Process according to claim 1 wherein the borate ester is tri(ortho-isopropylphenyl)borate.
5. Process according to claim 1 wherein the borate ester is tri(meta-cresyl)borate.
6. Process according to claim 1 wherein the borate ester is tri(2,4-dimethylphenyl)borate.
7. Process for resolving a mixture containing beta-picoline and gamma-picoline which comprises diluting said mixture with a hydrocarbon solvent, adding to the dilute mixture a borate ester having the formula

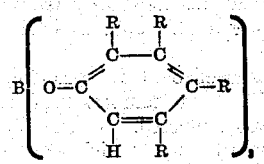

wherein R is selected from the group consisting of hydrogen and lower alkyl groups containing between one and six carbon atoms, separating the thus formed precipitate and distilling said precipitate to recover said gamma-picoline and distilling the mother liquor remaining after said precipitate has been removed to recover said beta-picoline.

8. Process for resolving a mixture containing gamma-picoline and 2,6-lutidine which comprises diluting said mixture with a hydrocarbon solvent, adding to the dilute mixture a borate ester having the formula

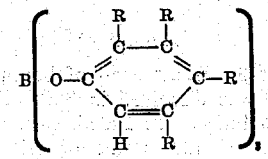

wherein R is selected from the group consisting of hydrogen and lower alkyl groups containing between one and six carbon atoms, separating the thus formed precipitate and distilling said precipitate to recover said gamma-picoline, and distilling the mother liquor remaining after said precipitate has been removed, to recover said 2,6-lutidine.

9. Process for resolving a mixture containing beta-picoline and 2,6-lutidine which comprises diluting said mixture with a hydrocarbon solvent, adding to the dilute mixture a borate ester having the formula

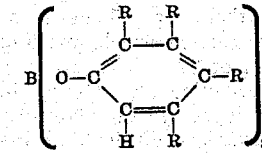

wherein R is selected from the group consisting of hydrogen and lower alkyl groups containing between one and six carbon atoms, separating the thus formed precipitate and distilling said precipitate to recover said beta-picoline, and distilling the mother liquor remaining after said precipitate has been removed to recover said 2,6-lutidine.

10. Process for recovering beta-picoline and gamma-picoline from a mixture also containing alpha-picoline, mixed lutidines and higher alkyl pyridines which comprises diluting said mixture with a hydrocarbon solvent, adding to the dilute mixture a borate ester having the formula

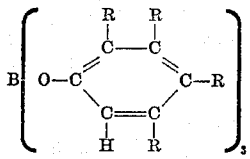

wherein R is selected from the group consisting of hydrogen and lower alkyl groups containing between one and six carbon atoms, separating the thus formed precipitate and distilling said precipitate to recover said beta-picoline and gamma-picoline as a binary mixture, diluting said binary mixture with a hydrocarbon solvent, adding to the dilute mixture a borate ester having the formula

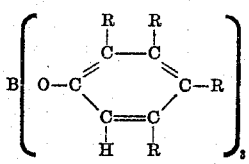

wherein R is selected from the group consisting of hydrogen and lower alkyl groups containing between one and six carbon atoms, separating the thus formed precipitate and distilling said precipitate to recover said gamma-picoline and distilling the mother liquor remaining after said precipitate has been removed to recover said beta-picoline.

11. Process for recovering gamma-picoline from a mixture also containing alpha-picoline, mixed lutidines and higher alkyl pyridines which comprises diluting said mixture with a hydrocarbon solvent, adding to the dilute mixture a borate ester having the formula

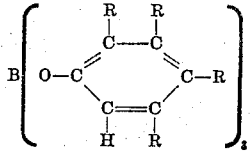

wherein R is selected from the group consisting of hydrogen and lower alkyl groups containing between one and six carbon atoms, separating the thus formed precipitate and distilling said precipitate to recover said gamma-picoline.

12. Process for recovering beta-picoline from a mixture also containing alpha-picoline, mixed lutidines and higher alkyl pyridines which comprises diluting said mixture with a hydrocarbon solvent, adding to the dilute mixture a borate ester having the formula

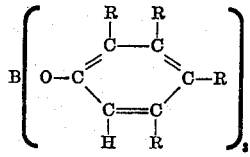

wherein R is selected from the group consisting of hydrogen and lower alkyl groups containing between one and six carbon atoms, separating the thus formed precipitate and distilling said precipitate to recover said beta-picoline.

No references cited.